United States Patent [19]

Shilling

[11] Patent Number: 5,430,944
[45] Date of Patent: Jul. 11, 1995

[54] ELECTRIC ROTARY HAND TOOL, ESPECIALLY HAND CIRCULAR SAW

[75] Inventor: Rainer Shilling, Friedrichsberg, Germany

[73] Assignee: Robert Bosch GmbH, Stuttgart, Germany

[21] Appl. No.: 90,034

[22] PCT Filed: Nov. 15, 1991

[86] PCT No.: PCT/DE91/00885
  § 371 Date: Jul. 9, 1993
  § 102(e) Date: Jul. 9, 1993

[87] PCT Pub. No.: WO92/11972
  PCT Pub. Date: Jul. 23, 1992

[30] Foreign Application Priority Data

Jan. 9, 1991 [DE] Germany .......... 41 00 412.4

[51] Int. Cl.$^6$ ............................... B27B 5/38
[52] U.S. Cl. ......................... 30/388; 30/276; 30/298.4
[58] Field of Search ........... 30/388, 391, 272.1, 30/273, 276, 286, 298.4

[56] References Cited

U.S. PATENT DOCUMENTS

| | | | |
|---|---|---|---|
| 2,539,468 | 1/1951 | Pihl | 318/762 |
| 2,702,098 | 2/1955 | Staak | 188/69 |
| 2,993,391 | 7/1961 | Bork | 30/391 |
| 4,402,241 | 9/1983 | Moores, Jr. | 30/391 X |
| 4,434,586 | 3/1984 | Muller et al. | 51/170 PT |

FOREIGN PATENT DOCUMENTS

| | | |
|---|---|---|
| 860195 | 1/1941 | France . |
| 2575242 | 6/1986 | France . |
| 2948080 | 6/1981 | Germany . |
| 3819181 | 12/1989 | Germany . |

*Primary Examiner*—Richard K. Seidel
*Assistant Examiner*—Raymond D. Woods
*Attorney, Agent, or Firm*—Michael J. Striker

[57] ABSTRACT

In an electric hand-operated machine tool, particularly a hand-operated circular saw, with a drive spindle which is driven by an electric motor via a gear unit, a spindle locking arrangement is provided for locking the drive spindle when changing the rotary tool, and includes a slot disk provided with at least one locking slot and arranged on the drive spindle or on the power take-off shaft of the motor so as to be fixed with respect to rotation relative thereto. The spindle locking arrangement also has a locking pin which is insertable in the locking slot against the force of a restoring spring. For the purpose of an automatic engagement of the spindle locking arrangement when resting the machine tool on a standing surface provided at the machine tool housing when changing the rotary tool, an actuating slide is supported in the machine tool housing so as to be axially displaceable and is coupled with the locking pin in such a way that the locking pin slides into the locking slot of the slot disk when the actuating slide is displaced axially until arriving behind the standing surface.

6 Claims, 3 Drawing Sheets

ELECTRIC ROTARY HAND TOOL, ESPECIALLY HAND CIRCULAR SAW

BACKGROUND OF THE INVENTION

The present invention relates to an electric hand-operated rotary machine tool, in particular a hand-operated circular saw.

In such hand-operated rotary machine tools the end side of the housing hood of the machine tool advantageously serves as a standing surface for resting the machine tool when changing the rotary tool. The standing surface is constructed in such a way that the machine tool stands on it in a stable balanced state. To change the rotary tool, it is necessary to loosen a clamping screw which presses the rotary tool against a positive-engagement member which is arranged on the drive spindle so as to be fixed with respect to rotation relative thereto. In so doing, a component of the drive train—which includes the drive motor, power take-off shaft, transmission, and drive spindle—must be secured against rotation by the spindle locking arrangement.

For this purpose, in a known hand-operated circular saw of the type mentioned above, the radially projecting locking pin at the machine tool housing is manually depressed so that it projects into the locking slot and thus locks the drive spindle. The locking pin must be held down manually while loosening and tightening the clamping screw. This results in an ergonomic disadvantage when exchanging the saw blade since one hand must be used in part for actuating the spindle locking arrangement.

SUMMARY OF THE INVENTION

Accordingly, it is an object of the present invention to provide an electric hand-operated rotary machine tool, and in particular a hand-operated circular saw, which avoids the disadvantages of the prior art.

In keeping with these objects and with others which will become apparent hereinafter, one feature of the present invention resides, briefly stated, in an electric hand-operated rotary machine tool, particularly a hand-operated circular saw, which has an actuating slide projecting from a standing surface at a machine tool housing and supported in the machine tool housing so as to be axially displaceable, and the actuating slide is coupled with a locking pin of a spindle locking arrangement for fixing a drive spindle when changing the rotary tool, so that when the actuating slide is axially displaced until arriving behind the standing surface the locking pin is inserted into the locking slot of the spindle locking arrangement when the latter is in an aligned position.

When the electric hand-operated rotary machine tool is designed in accordance with the present invention, it has the advantage over the prior art that the spindle locking arrangement is actuated automatically when the machine tool is set down on the standing surface for changing the rotary tool. Accordingly, there is a substantial improvement with respect to ergonomics when exchanging the rotary tool in that the operator now has both hands free for loosening the clamping screw and changing the rotary tool. When the machine tool is lifted again the restoring spring automatically pushes back the locking pin and also returns the actuating slide via the coupling of the locking pin and actuating slide so that the drive spindle is unlocked on the one hand and the end of the actuating slide again projects out of the cover over the standing surface on the other hand.

According to a preferred embodiment form of the invention, the coupling between the locking pin and actuating slide can be realized in that a displacing piston arranged at right angles to the actuating slide is held in the machine tool housing so as to be axially displaceable and carries a displacing ramp extending at an acute angle to the piston axis, the actuating slide contacting this displacing ramp by an actuating surface extending at an acute angle to the slide axis. The locking pin which is arranged coaxially relative to the displacing piston is coupled with the latter via the restoring spring. The restoring spring which exerts a restoring force directed radially outward is supported on one side at the machine tool housing and on the other side at a spring disk located at the locking pin.

To prevent faulty operation of the machine tool via the automatic spindle locking arrangement, e.g. disengagement of the spindle locking arrangement when the machine tool is in operation, or to enable the machine tool to be set down on the standing surface at any time in a stable standing position, also when the locking pin and locking slot are out of alignment, it is provided according to another embodiment form of the invention that the locking pin is guided in the displacing piston so as to be axially displaceable and a pressure spring is arranged between the displacing piston and locking pin, the spring force of the pressure spring being greater than the restoring force of the restoring spring. When disengaging the spindle locking arrangement, the displacing piston can be displaced relative to the locking pin due to the pressure spring when the locking pin is not located in the slot, e.g. because of the rotation of the slot disk, so that the actuating slide is pushed into the machine tool housing, but the locking pin does not engage in the slot of the slot disk. The pressure spring ensures that the locking pin engages in the locking slot and accordingly that the spindle is secured against rotation only when the locking pin is no longer blocked, e.g. when the motor is stopped and the locking pin and locking slot are aligned.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
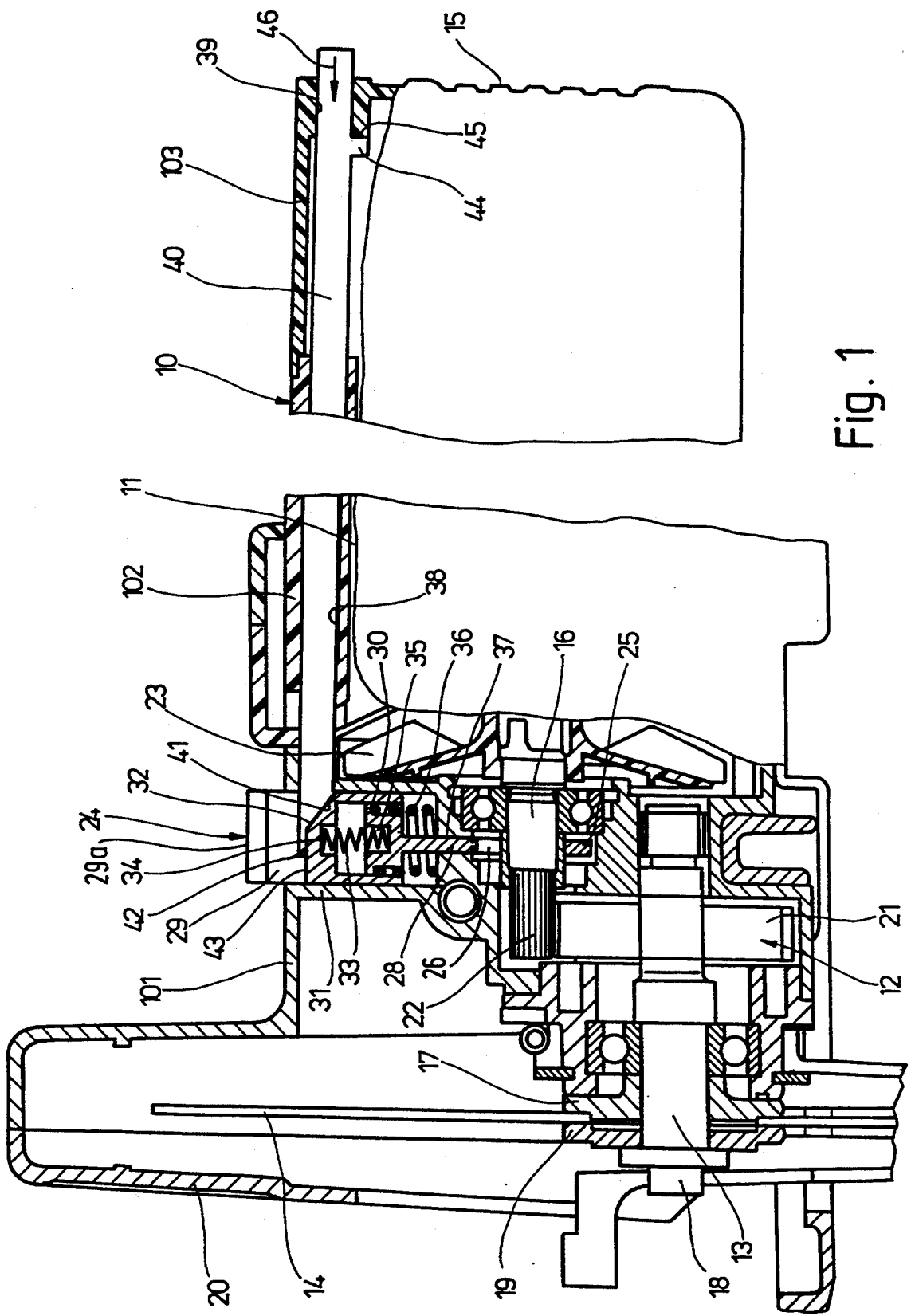
FIG. 1 a partial longitudinal section of a hand-operated circular saw with disengaged spindle locking arrangement.
Figure 2:
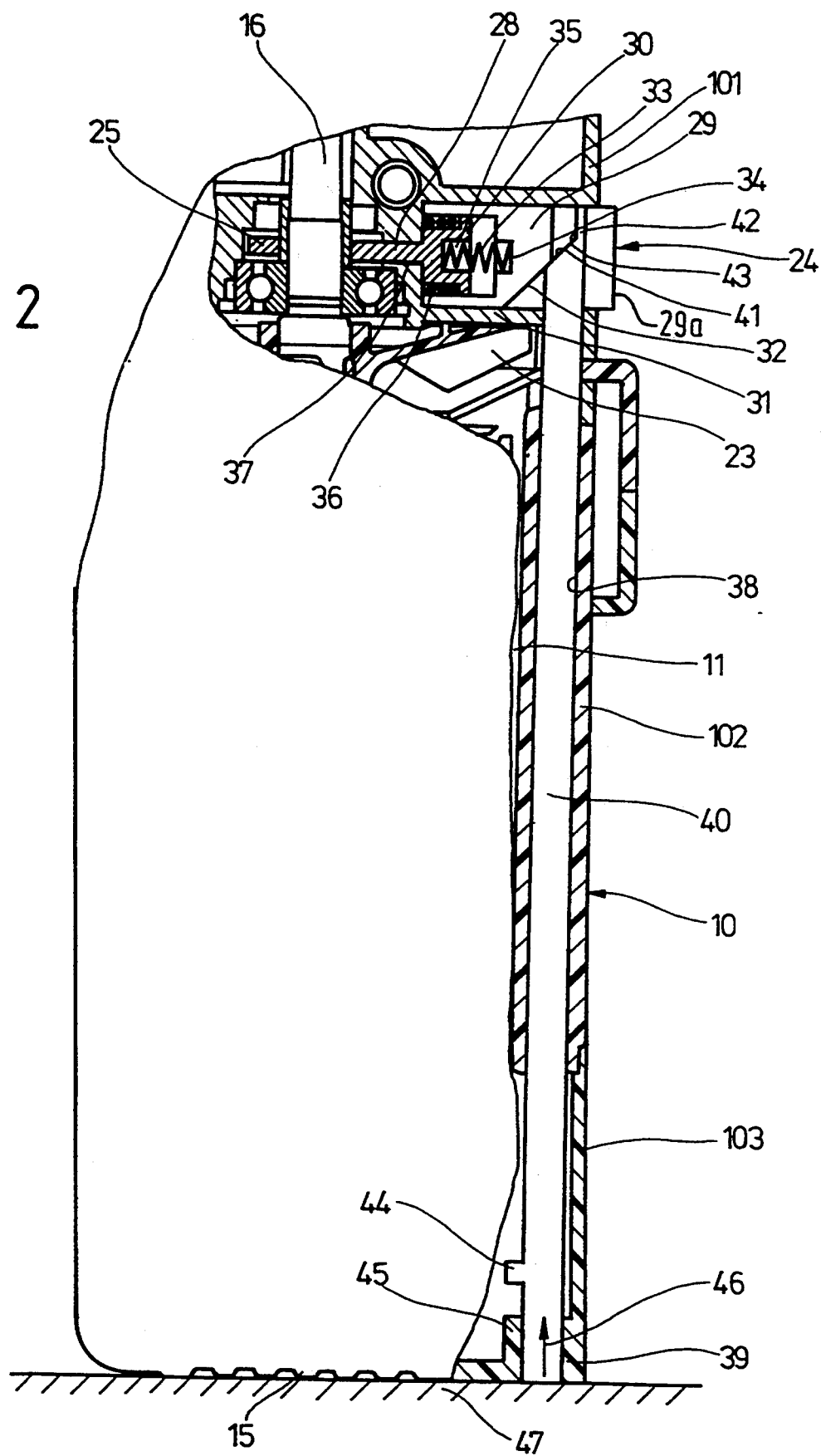
FIG. 2 a partial longitudinal section of the hand-operated circular saw in FIG. 2 with engaged spindle locking arrangement.

The hand-operated circular saw in longitudinal section shown in a cut-out view in FIGS. 1 and 2 as an example of an electric hand-operated rotary machine tool has a three-part machine tool housing 10 which receives an electric drive motor 11, a reduction gearing 12, and a drive spindle 13. The machine tool housing 10 is constructed in three parts and has a metallic front part 101 carrying a hand guard 20 for a saw blade 14 which is held on the drive spindle 13 so as to be fixed with respect to rotation relative thereto, a cylindrical center part 102 of plastic at which the drive motor 11 is fastened, and a cover 103 of plastic which is attached to the end of the center part and whose end face is constructed as a standing surface 15 for resting the machine tool in a stable balanced state. Like the power take-off shaft 16 of the electric drive motor 11, the drive spindle 13 is also rotatably supported in the front part 101 of the machine tool housing 10 and carries a positive-locking member 17 which is fixed with respect to rotation relative to it, the saw blade 14 being pressed against the positive-locking member 17 in a frictionally engaging manner. The saw blade 14 is axially tightened at the positive-locking member 17 via a clamping disk 19. The reduction gearing 12 has a toothed wheel 21 arranged on the drive spindle 13 so as to be fixed with respect to rotation relative to it and a drive pinion 22 which meshes with the toothed wheel 21 and sits directly on the power take-off shaft 16 or has a rotary type connection with the power take-off shaft 16 via another toothed wheel. In addition to the power take-off shaft 16, the blower 23 of the drive motor 11 arranged on the power take-off shaft 16 is also shown in FIGS. 1 and 2.

Figure 3:
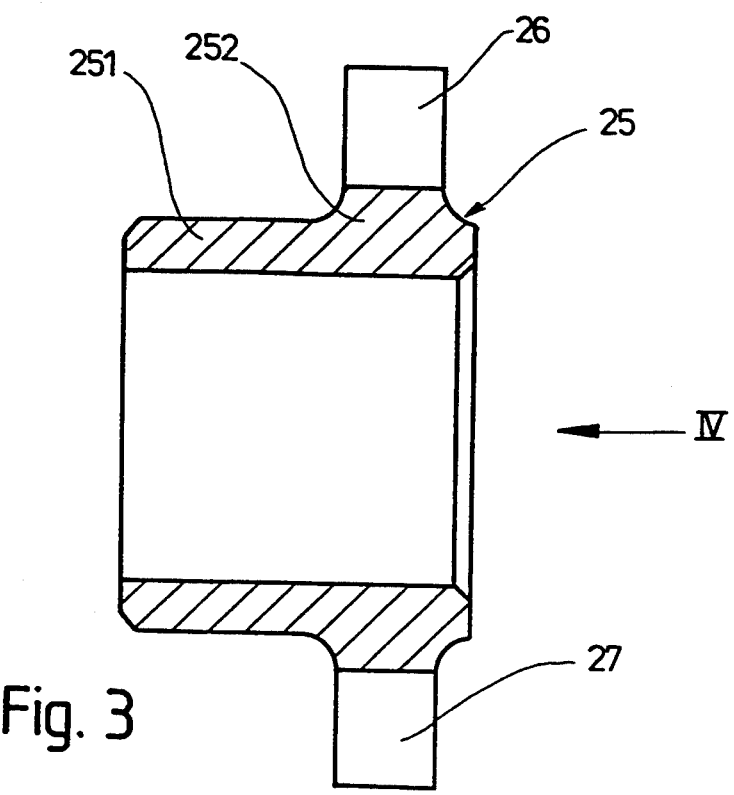
FIG. 3 a longitudinal section of a slot disk of the spindle locking arrangement in the hand-operated circular saw according to FIGS. 1 and 2.
Figure 4:
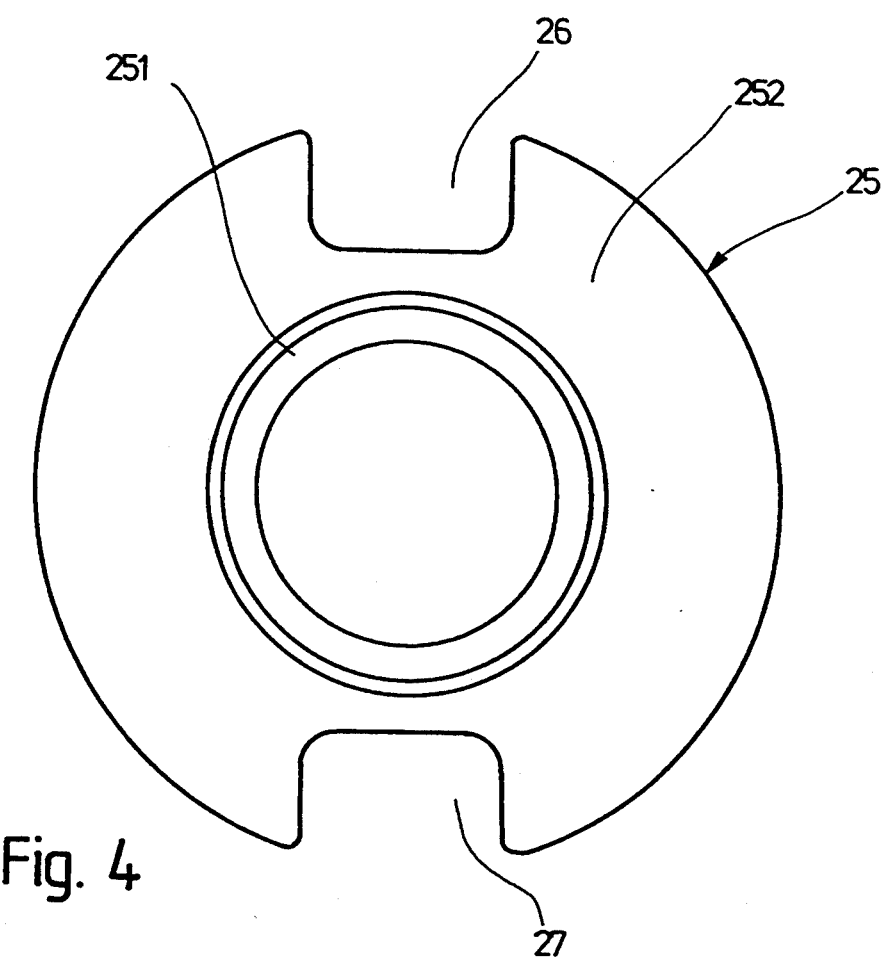
FIG. 4 a top view of the slot disk in the direction of arrow IV in FIG. 3.

To lock the drive spindle 13 for the purpose of changing the saw blade 14, a spindle locking arrangement 24 is provided which secures the drive spindle 13 against rotation in the engaged state. The spindle locking arrangement 24 has a slot disk 25 which is arranged on the power take-off shaft 16 of the drive motor 11 so as to be fixed with respect to rotation relative thereto. The slot disk 25 is shown in an enlarged view in FIGS. 3 and 4 in longitudinal section and in a top view, respectively. The slot disk 25 includes a bushing 251 which can be slid onto the power take-off shaft 16 and a radial flange 252 which is integral with the bushing 251. Two locking slots 26, 27 are arranged diametrically at the edge of the radial flange 252. The spindle locking arrangement 24 also includes a locking pin 28 whose free end can engage in the locking slot 26 or 27 so as to prevent a rotation of the power take-off shaft 16. The locking pin 28 is guided in a displacing piston 29 so as to be axially displaceable. A spring disk 30 is cast integrally with the locking pin 28 at the end of the locking pin 28 remote of the slot disk 25. The spring disk 30 simultaneously serves to guide the locking pin 28 in the displacing piston 29 whose lower portion is constructed so as to be hollow. The displacing piston 29 is guided so as to be axially displaceable in a radially aligned housing pocket 31 in the front part 101 of the machine tool housing 10 and carries a displacing ramp 32 which is arranged at an angle of 45° relative to the piston axis, specifically in such a way that a force acting on the displacing piston 29 vertically relative to the piston axis causes a displacement of the displacing piston 29 in the direction of the slot disk 25. A pressure spring 33 is supported between the spring disk 30 of the locking pin 28 and the displacing piston 29, its two end sides being guided in concentric pocket holes 34, 35 in the displacing piston 29 and spring disk 30. A restoring spring 36 is supported between the spring disk 30 and the base of the housing pocket 31. The restoring spring 36 is guided at one end on centering means at the spring disk 30. The restoring spring 36 coaxially encloses the locking pin 28 passing through a bore hole 37 at the base of the housing pocket 31 and is radially aligned with respect to the flange 252 of the slot disk 25 directly in front of this flange 252 when the spindle locking arrangement 24 is disengaged as shown in FIG. 1.

An actuating slide 40 is guided so as to be axially displaceable in a guide 38 at the center part 102 of the machine tool housing 10 and in a guide 39 at the cover 103 in the interior of the machine tool housing 10 for engaging the spindle locking arrangement. The displacing direction of the actuating slide 40 extends at right angles to the displacing direction or piston axis of the displacing piston 29. The actuating slide 40 carries an actuating surface 41 at its end facing the displacing piston 29. The actuating surface 41 extends at an angle of 45° to the axis of the actuating slide 40 and parallel to the displacing ramp 32 at the displacing piston 29. The displacing ramp 32 of the displacing piston 29 contacts this actuating surface 41 under the influence of the restoring spring 36 which loads the displacing piston 29 via the pressure spring 33. A displacement of the actuating slide 40 and displacing piston 29 is prevented by a locking protuberance 42 at the actuating slide 40, which locking protuberance 42 engages at a stop face 43 extending at a right angle to the piston axis at the displacing piston 29 in a continuation of the displacing ramp 32. The end of the actuating slide 40 remote of the displacing piston 29 projects out of the cover 103 of the machine tool housing 10 over the standing surface 15. The actuating slide 40 is prevented from falling out or being pulled out of the guides 38, 39 by a cam 44 which projects away radially at the actuating slide 40 and contacts a stop 45 constructed at the guide 39 in the disengaged position of the spindle locking arrangement 24 shown in FIG. 1.

In the disengaged position of the spindle locking arrangement 24 shown in FIG. 1, the restoring spring 36 keeps the locking pin 28 from engaging with the locking slots 26, 27 in the slot disk 25. At the same time, the displacing piston 29 is externally loaded in the radial direction by the restoring spring 36 via the pressure spring 33 so that the actuating slide 40 is pressed against the stop 45 by its cam 44 via the displacing ramp 32 and the actuating surface 41. The slot disk 25 can rotate freely and the hand-operated circular saw is in the operational state.

To change the saw blade 14, the hand-operated circular saw is rested on its standing surface 15 at the cover 103 on a table or the like, indicated by reference number 47, where it stands in a stable balanced position. In so doing, the actuating slide 40 is pushed into the machine tool housing 10 in the direction of the arrow 46 in FIG. 1 by the weight of the hand-operated circular saw until the end of the actuating slide 40 comes to rest in the plane of the rest surface 15. A further displacing movement of the actuating slide 40 is limited by the locking protuberance 42 contacting the wall of the housing pocket 31. This prevents a disengagement of the actuating surface 41 from the displacing ramp 32. As a result of this displacing movement of the actuating slide 40, the displacing piston 29 is displaced in the radial direction toward the power take-off shaft 16 via the actuating surface 41 at the actuating slide 40 and the displacing ramp 32 at the displacing piston 29. If one of the two locking slots 26, 27 in the slot disk 25 is located opposite the locking pin 28, the locking pin 28 is slid into the corresponding notch 26 or 27 via the pressure spring 33. The slot disk 25 which is connected with the power take-off shaft 16 so as to be fixed with respect to rotation relative thereto is accordingly secured against rotation. The entire drive train including the power take-off shaft 16, reduction gearing 12, and drive spindle 13 is accordingly secured against rotation. The clamping screw 18 on the drive spindle 13 can be loosened without difficulty and the saw blade 14 can be changed.

If neither of the two locking slots 26, 27 lies opposite the locking pin 28 for the above-described disengaging of the spindle locking arrangement 24, the locking pin 28 is prevented from displacement by the slot disk 25. The displacement of the displacing piston 29 triggered by the actuating slide 40 only causes the pressure spring 33 to be compressed. The pressure spring 33 pushes the locking pin 28 into the locking slot 26 or 27 only when the slot disk 25 is rotated by the rotation of the drive spindle 13 to the extent that the locking pin 28 is again aligned with one of the locking slots 26, 27. This concludes the engagement process of the spindle locking arrangement 24.

After changing the saw blade 14 and tightening the clamping screw 18, the hand-operated circular saw is lifted from its standing surface 15. The locking pin 28 is pushed out of the locking slot 26 or 27 of the slot disk 25 under the influence of the restoring spring 36 and the displacing piston 29 in the housing pocket 31 is pushed out at the same time via the more rigid pressure spring 33. The actuating slide 40 is pushed back, via the displacing ramp 32 and the actuating surface 41, into its initial position shown in FIG. 1 in which its end projects over the standing surface 15.

The described spindle locking arrangement 24 simultaneously offers protection against faulty operation when e.g. the actuating slide 40 is accidentally or deliberately pushed in in the direction of arrow 46 when the drive motor 11 is running. In this case also, the locking pin 28 cannot engage with either one of the locking slots 26, 27 during the incipient displacing movement of the displacing piston 29 and is secured against axial displacement by the rotating slot disk 25. As was already described, the pressure spring 33 is now compressed so that the spindle locking arrangement 24 remains disengaged in spite of the actuating slide 40 sliding into the machine tool housing 10.

In addition, the displacing piston 29 is constructed in such a way that it projects out of the housing pocket 31 beyond the wall of the front part 101 of the housing with its end face 29a in its initial position. The spindle locking arrangement 24 can accordingly also be released directly by finger pressure on the displacing piston 29 in the absence of a suitable rest surface in the work place for standing the machine tool.

It will be understood that each of the elements described above, or two or more together, may also find a useful application in other types of constructions differing from the types described above.

While the invention has been illustrated and described as embodied in an electric rotary hand tool, especially hand circular saw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An electric hand-operated rotary machine tool formed as a hand-operated circular saw, comprising a rotary tool; a drive spindle on which said rotary tool is clamped; an electric drive motor having a power take-off shaft; a gear unit coupling said power take-off shaft of said electric drive motor with said drive spindle; a machine tool housing receiving said drive motor and said gear unit and having a standing surface; a spindle locking arrangement for fixing said drive spindle when changing said rotary tool, said spindle locking arrangement being switchable on voluntarily and having a slot disk provided with at least one locking slot and arranged non-rotatably on one of said power take-off shaft and said drive spindle, and a locking pin slidable into said locking slot against a spring force; an actuating slide projecting over said standing surface at said machine tool housing and supported in said machine tool housing so as to be displaceable, said actuating slide being coupled with said locking pin in such a way that when said actuating slide is displaced until arriving behind said standing surface said locking pin is inserted into said locking slot when said locking slot is in an aligned position; and a displacing piston arranged to be displaceable towards said actuating slide and held in said machine tool housing so as to be displaceable, said displacing piston carrying a displacing ramp extending at an acute angle to an axis of said displacing piston, said displacing ramp being contacted by an actuating surface formed at said actuating slide and extending at an acute angle relative to an axis of said actuating slide, said locking pin being coupled with said displacing piston; and a restoring spring which couples said locking pin with said displacing piston and exerts a restoring force; and a spring disk located at said locking pin so that said restoring spring having one end supported at said machine tool housing and another end supported at said spring disk.

2. An electric hand-operated rotary machine tool as defined in claim 1, wherein said rotary tool is a circular saw blade.

3. An electric hand-operated rotary machine tool as defined in claim 1, wherein said locking pin is guided so as to be displaceable in said displacing piston; and further comprising a pressure spring having a spring force which is greater than a spring force of said restoring spring and supported between said displacing piston and said locking pin.

4. An electric hand-operated rotary machine tool as defined in claim 3, wherein said displacing piston has a pocket hole, said pressure spring having one end receiving said pocket hole of said displacing piston and another end received in said spring disk.

5. An electric hand-operated rotary machine tool as defined in claim 1, wherein said spring disk is cast integrally with said locking pin and serves as a guide for said locking pin in said displacing piston.

6. An electric hand-operated rotary machine tool as defined in claim 1, wherein said machine housing has an outer wall, said displacing piston projecting over said outer wall of said machine tool housing when said displacing piston is in an unactuated initial position determined by said restoring spring, and in said initial position carrying an actuating surface at an end for manual displacement against the force of said restoring spring.

* * * * *